July 20, 1926.
H. M. MURPHY
AUXILIARY SINK STRAINER
Filed Feb. 27, 1926
1,592,866
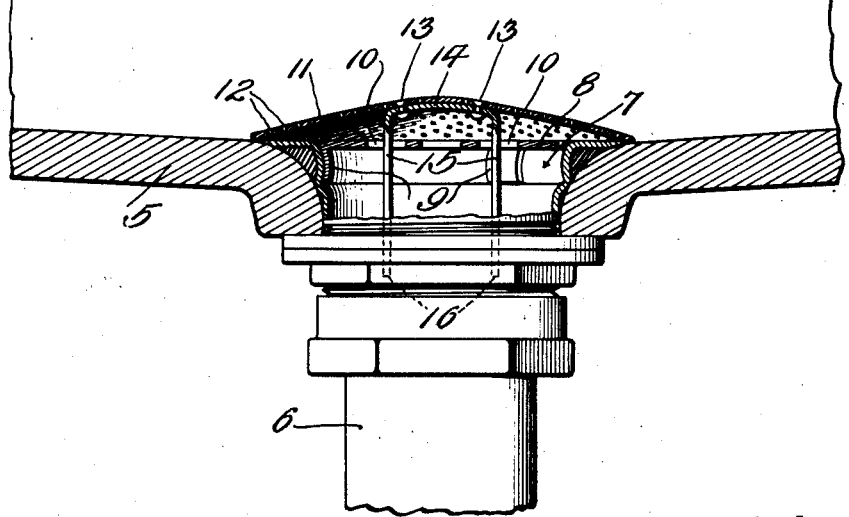
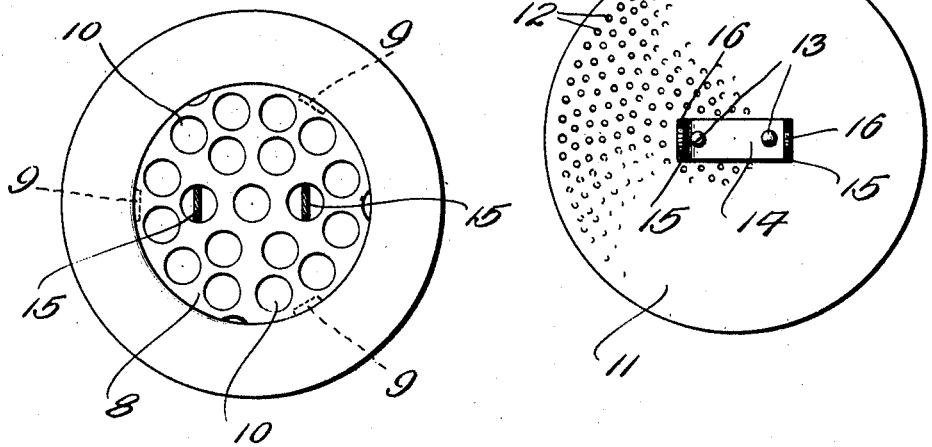
INVENTOR.
Howard M Murphy Patented July 20, 1926.

1,592,866

UNITED STATES PATENT OFFICE.

HOWARD M. MURPHY, OF PHILADELPHIA, PENNSYLVANIA.

AUXILIARY SINK STRAINER.

Application filed February 27, 1926. Serial No. 91,129.

The invention aims to provide an auxiliary strainer for sinks, designed primarily for use with kitchen sinks and adapted to cover the usual perforated strainer plate, novel means being provided on the auxiliary strainer for reception in perforations of the sink strainer plate for the purpose of detachably holding said auxiliary strainer in place.

With the foregoing in view, the invention resides in the novel subject matter hereinafter described and claimed, the description being supplemented by the accompanying drawing.

Fig. 1 is a vertical sectional view partly in elevation showing the auxiliary strainer applied to a sink strainer plate.

Fig. 2 is a horizontal sectional view through the downwardly projecting arms of the auxiliary strainer and a top plan view of the ordinary strainer plate, showing more clearly the manner in which said arms are received in perforations of said plate.

Fig. 3 is a bottom plan view of the auxiliary strainer.

In the drawing above briefly described, the numeral 5 designates a portion of a sink bottom having a trap 6 whose inlet mouth 7 is provided with a perforated strainer plate 8 which is removably held in place by the usual spring fingers 9 engaging the inner side of said throat. The present invention is adapted to guard the plate 8 and prevent small particles of food, coffee grounds, etc., from passing through its perforations 10 and clogging the trap. The preferred form of construction is illustrated and will be herein specifically described, with the understanding at the outset that within the scope of the invention as claimed, variations may be made if desired.

The number 11 designates an auxiliary strainer plate of circular outline and having fine perforations 12, said plate being of a size to cover the strainer plate 8. Secured to the lower side of the plate 11 by rivets 13 or in any other desired manner, is the intermediate portion 14 of a metal strip which is bent into arched form, the end portions of said strip constituting downwardly projecting arms 15 for reception in two of the perforations 10, so as to hold the plate 11 in proper position, though permitting easy removal thereof.

The plate 11 is upwardly bulged into shallow dome shape and thus disposes the strip portion 14 and the heads of the rivets 13, if the latter be used, above the plane of the edge portion of the plate. Hence, this edge portion may contact tightly with the sink strainer plate 8 without hindrance by contact of part 14, parts 13, or both with said plate 8. Moreover, this formation prevents closing of all of the perforations 12 by setting a pot, pan or the like upon the plate 11.

Both the metal strip 14—15 and the plate 11 are preferably formed of brass, nickelplated or otherwise finished, and these parts possess sufficient rigidity to prevent accidental bending thereof. Moreover, when the plate 11 is lifted free of the plate 8 and the lower portions of the arms 15 are allowed to remain in their respective perforations 10, the device may be effectively used as a means for prying the sink strainer plate 8 from the mouth 7, should this be desired.

The lower ends 16 of the arms 15 are by preference rounded or otherwise suitably shaped to facilitate insertion of said arms into perforations of the plate 8. This is indicated by the shading in Fig. 3.

Excellent results have been obtained from the details disclosed and they are therefore preferably followed. However, as before stated, variations may be made.

I claim:—

In combination with a perforated sink strainer plate, having spring means by which it is held in place; an auxiliary perforated strainer plate covering the first named plate, and a pair of arms secured to and projecting downwardly from said auxiliary strainer plate, said arms being rigid in one direction, passing downwardly through perforations of said first named plate and extending downwardly from the latter, whereby grasping of the auxiliary strainer plate, upward movement thereof away from said first named plate and lateral tilting of said auxiliary plate will cause said arms to pry said first named plate out of position, permitting removal of both plates.

In testimony whereof, I have hereunto affixed my signature.

HOWARD M. MURPHY.